United States Patent [19]

Acar et al.

[11] Patent Number: 5,137,608

[45] Date of Patent: Aug. 11, 1992

[54] ELECTROCHEMICAL DECONTAMINATION OF SOILS OR SLURRIES

[75] Inventors: Yalcin B. Acar; Robert J. Gale, both of Baton Rouge, La.

[73] Assignee: Board of Supervisors of Louisiana State University and Agricultural and Mechanical College, Baton Rouge, La.

[21] Appl. No.: 443,936

[22] Filed: Nov. 30, 1989

[51] Int. Cl.$^5$ .............................................. C25C 1/22
[52] U.S. Cl. .................... 204/130; 204/180.1; 204/182.2
[58] Field of Search ............... 204/182.2, 130, 180.1

[56] References Cited

U.S. PATENT DOCUMENTS

| | | | |
|---|---|---|---|
| 2,831,804 | 4/1958 | Collopy | 204/131 |
| 4,453,594 | 6/1984 | Patton et al. | 204/130 |
| 4,479,857 | 10/1984 | Barton, Jr. | 204/130 |
| 5,074,986 | 12/1991 | Probstein et al. | 204/130 |

OTHER PUBLICATIONS

Daniel et al., Electrokinetic Decontamination of soil, Biennium progress report (Oct. 30, 1989).
Putnam, Determination of pH gradients in the Electrochemical Processing of Kaolinite (Dec. 1988).
Mitchell, Fundamentals of Soil Behavior, pp. 353-370 (1976).
Segall et al., Electro-Osmosis Chemistry and Water Quality, J. Geotech. Engr. Div., ASCE, Technical Notes, vol. 106, No. GT10, pp. 1148-1152 (1980).
Bruch, Electroosmosis in Ground Water Pollution Control, U.S. Dept. Commerce PB-273 377 (1976).
Probstein et al., Quantification of Fluid & Chemical Flow in Electrokinetics, draft position paper presented at Workshop on Electro-Kinetic Treatment and its Application in Environmental-Geotechnical Engineering for Hazardous Waste Site Remediaton (University of Washington, Seattle, Wash., Aug. 4-5, 1986).
Mitchell, Potential Uses of Electrokinetics for Hazardous Waste Site Remediation, presented at Workshop on Electro-Kinetic Treatment and its Application in Environmental-Geotechnical Engineering for Hazardous Waste Site Remediation (University of Washington, Seattle, Wash., Aug. 4-5, 1986).
Runnells et al., A Laboratory Study of Electromigration as a Possible Field Technique for the Removal of Contaminants from Ground Water, Groundwater Monitoring Review, pp. 85-91 (Summer 1986).
Daniel et al., Electrokinetic Decontamination of Soil, Biennium Progress Report Presented to Gulf Coast Hazardous Substance Research Center, Beaumont, Tex. (Oct. 30, 1989).
Lageman et al., Theory and Practice of Electro-Reclamation, presented at Forum on Innovative Hazardous Waste Treatment Technologies, Atlanta, Ga. (Jun. 19-21, 1989).
Putnam, Determination of pH Gradients in the Electrochemical Processing of Kaolinite, M. S. Thesis Louisiana State University, Baton Rouge, La. (Dec. 1988).
Acar et al., Decontamination of Soils Using Electro-Osmosis, Abstract and Slides of Presentation at First Annual Symposium on Hazardous Waste Research (Hazardous Waste Research Center, Baton Rouge, La., (Oct. 20-21, 1987).
Acar et al., Decontamination of Soils Using Electro-Osmosis, Research Proposal submitted to Louisiana Board of Regents (Jan. 9, 1987).

Primary Examiner—John Neibling
Assistant Examiner—Arun S. Phasge
Attorney, Agent, or Firm—John H. Runnels

[57] ABSTRACT

The electrochemical decontamination of soil or slurries through the use of an inert anode, a nonreactive cathode, and supplying water to the soil near the anode.

33 Claims, 14 Drawing Sheets

ELECTROCHEMICAL DECONTAMINATION OF SOILS OR SLURRIES

BACKGROUND OF THE INVENTION

Contaminants migrating from unengineered facilities, accidental spills, and industrial operations threaten health and ground water supply. Such contamination often covers large volumes of soil underlying several acres of surface area. In view of the high cost of land, limited resources, and the fact that contamination can occur in densely populated or industrialized areas, there exists a need to find new, economical, and efficient technologies of remediation for rapid reclamation and rehabilitation of such sites.

Coupling between electrical, chemical, and hydraulic gradients is responsible for different types of electrokinetic phenomena in soils. In electro-osmosis, the pore fluid moves due to the application of a constant, low DC current by electrodes inserted in soil. In the five decades since its first application in 1947, electro-osmosis has been used in applications such as (1) improving stability of excavations, (2) increasing pile strength, (3) stabilization of fine-grained soils, (4) dewatering of foams, sludges, and dredgings, (5) groundwater lowering and barrier systems, (6) chemical grout injection, (7) removal of metallic objects from the ocean sea bottom, (8) decreasing pile penetration resistance, (9) increasing petroleum production, (10) determination of volume change and consolidation characteristics of soils, (11) removal of easily water-soluble salts from agricultural soils, and (12) separation and filtration of certain materials in soils and solutions.

None of the prior art in electro-osmosis resulted in successful and consistent decontamination of soils. The prior art references encountered premature precipitation of contaminants due to basic conditions created in the soil surrounding the cathode. The prior art also teaches away from adding water to the soil during electro-osmosis, much of the emphasis of the prior electro-osmosis work being on dewatering soils to consolidate or stabilize them.

SUMMARY OF THE INVENTION

The present invention overcomes these problems by supplying water or an aqueous solution to the soil during electro-osmosis, particularly in an area near the anode. This added water, and its electrolysis result in an acid front moving through the soil over time from the anode to the cathode, permitting contaminants to be desorbed and transported to the cathode, where they may be electrodeposited or reduced. The present invention enhances decontamination of soil through the control of the movement of an acid front through the soil, and through conditions permitting the efficient electrodeposition or reduction of contaminants, in addition to the use of electro-osmosis. Non-reactive, inert electrodes are used to eliminate a potential source of newly introduced contamination.

DETAILED DESCRIPTION OF THE INVENTION

The embodiment of the present invention described here used electrokinetic phenomena to remove Pb(II) from water-saturated kaolinite under controlled conditions. Pb(II) was selected because it is a typically encountered heavy metal contaminant. The development and movement of pH gradients during electro-osmosis were also examined, because it was found that pH gradients play an important role in contaminant removal.

In the absence of all but traces of electrolyzable solutes in the pore fluid (e.g., metal ions, $Cl^-$, organic matter, pollutants, dissolved oxygen, etc.) and for the case of inert electrodes, approximately 100% faradaic efficiency can be assumed for water electrolysis by electrodes inserted in a water-saturated soil mass. The primary electrode reactions are:

$$2H_2O - 4e^- \rightarrow O_2 + 4H^+$$

$$4H_2O + 4e^- \rightarrow 2H_2 + 4OH^-$$

Other reactions may occur, e.g., when concentrations of a heavy metal contaminant can be electrolyzed. The following cathoode reactions are among those possible:

$$H^+ + e^- \rightarrow \tfrac{1}{2}H_2$$

$$Pb^{2+} + 2e^- \rightarrow Pb$$

The production of $H^+$ ions at the anode decreases the pH, while the production of $OH^-$ ions at the cathode increases the pH. Thus, in addition to the migration of existing anions and cations in the soil under the electrical field, two supplemental ionic species are generated which can have a significant influence on overall conductance and electrochemical processing.

It is important that the electrodes used will not themselves electrolyze or dissolve under the particular conditions encountered. Not only could the resulting ions affect the other chemical reactions and migration of chemical species, but the resulting ions themselves could introduce a new source of contamination. It is therefore preferable to use electrodes inert to anodic dissolution, such as carbon, platinum or gold. The use of such electrodes will avoid the introduction of other ions into the medium.

Figure 1:
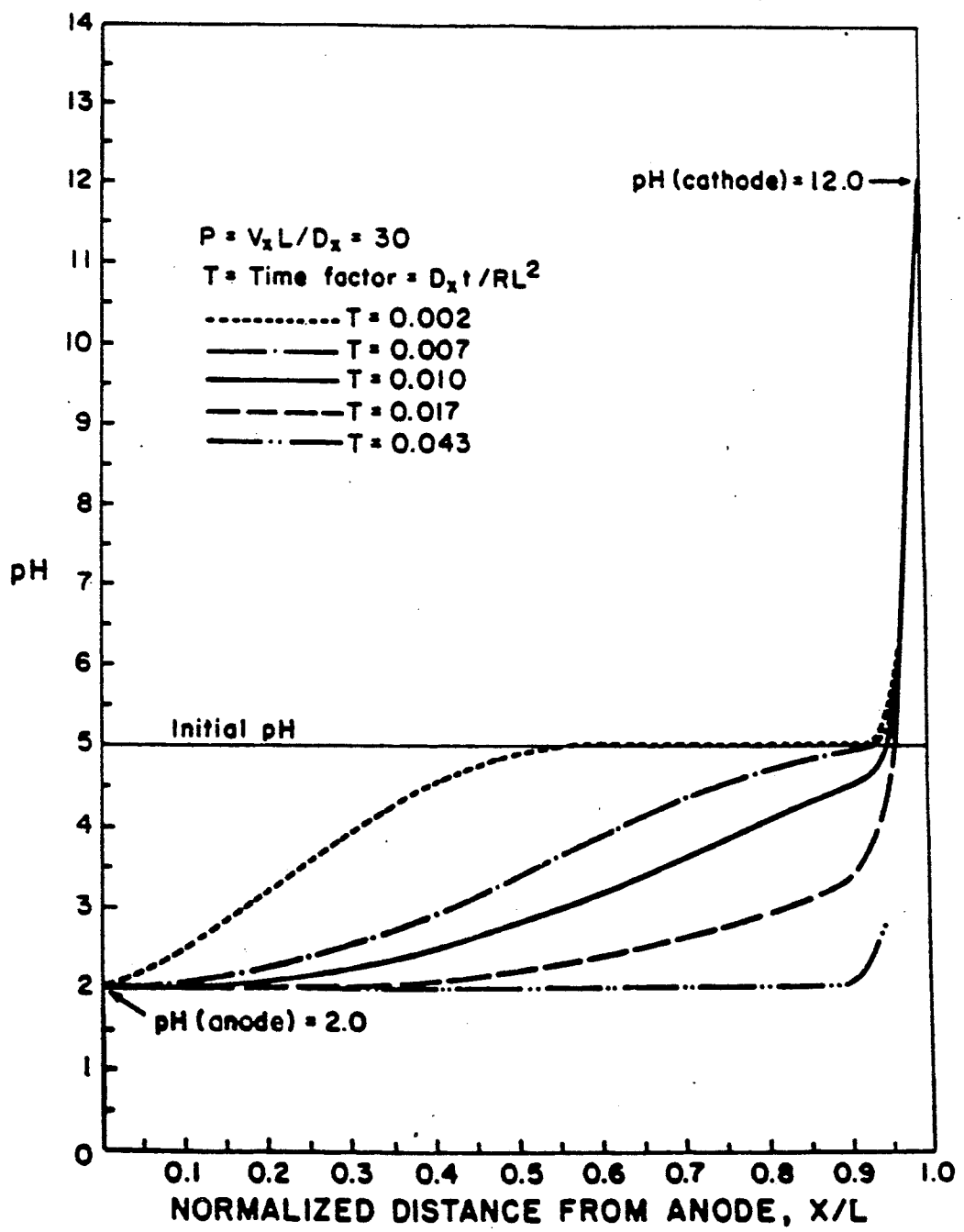
FIG. 1 illustrates theoretical distributions of pH as a function of time.
Figure 2:
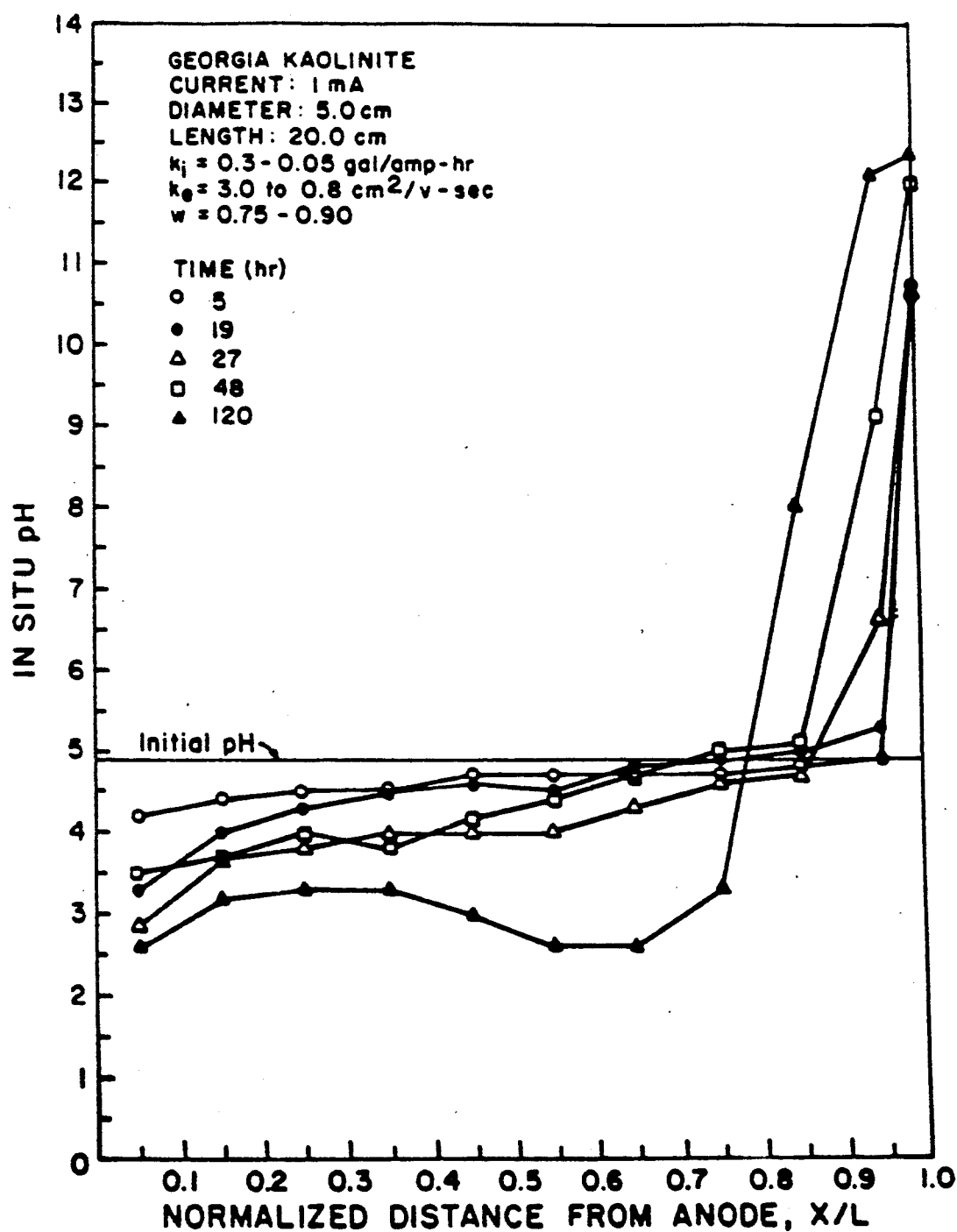
FIG. 2 illustrates experimental measurements of pH distributions as a function of time.

FIG. 1 shows theoretical predictions for the pH distribution as a function of time, and FIG. 2 shows comparable experimental results. These figures demonstrate the movement of the acid front generated at the anode. This acid front moves toward the cathode by diffusion, advection, and migration. As a result of the pH gradients, the following physico-chemical interactions would be expected:

(1) Dissolution of the clay minerals outside a pH range of 7-9,
(2) Adsorption/desorption and exchange of cations by replacement with $H^+$ and $OH^-$,
(3) Precipitation of salts and metal ions in very high or very low pH environments, leading to cementitious products,
(4) Changes in the structure and hence the engineering characteristics of the soil due to variations in the pore fluid chemistry.

The techniques of the present invention promote the movement of the low pH front by migration and advection, leading to the desorption of inorganic cations or other adsorbed contaminent species from the clay surfaces, together with concurrent electro-osmotic flow, thus removing these species from fine-grained or other soils.

Five tests were conducted for lead removal. Constant current conditions were used in all tests to keep constant the net rates of the electrolysis reactions at all times, and to reduce complications arising from boundary conditions. The dimensions of the specimens, duration of tests, current used, and other parameters in these tests are presented in Table 1. Secondary temperature effects have been reported to decrease the efficiency of electro-osmotic flow when the current density is greater than 5 $mA/cm^2$. In order to avoid temperature effects, the current density used in all tests was about two orders of magnitude lower than 5 $mA/cm^2$.

TABLE 1

| Parameter | Test No. | | | | |
|---|---|---|---|---|---|
| | 1 | 2 | 3 | 4 | 5 |
| Current (mA) | 1 | 3 | 3 | 3 | 3 |
| Dimensions | | | | | |
| Area ($cm^2$) | 81.1 | 81.1 | 81.1 | 81.1 | 81.1 |
| Length (cm) | 20.3 | 10.2 | 20.3 | 10.2 | 10.2 |
| Duration (hr) | 638 | 100 | 1285 $(763)^2$ | 409 | 545 |
| Current Density ($mA/cm^2$) | 0.012 | 0.037 | 0.037 | 0.037 | 0.037 |
| Total Charge (amp-hr) | 0.638 | 0.300 | 3.86 $(2.89)^2$ | 1.227 | 1.640 |
| Total Charge/ unit volume of soil (amp-hr/$m^3$) | 388 | 362 | 2345 $(1390)^2$ | 1483 | 1982 |
| Porsity of the specimen | 0.68 | 0.76 | 0.68 | 0.72 | 0.71 |
| Pore Volume,[1] $cm^3$ | 1120 | 629 | 1120 | 596 | 587 |
| Total Flow ($cm^3$) | 1304 | 110 | $1183^2$ | 1419 | 1956 |
| Pore Volumes of Flow | 1.16 | 0.17 | 1.06 | 2.38 | 3.33 |

[1]Pore Volume = (Total Volume) × (Porosity of Specimen)
[2]Test continued until 1285 hr. Flow stopped at 763 hrs.

Tests showed that the efficiency of the process for Pb(II) removal depended on the extent to which the acid front reached the cathode. Therefore, Tests 3 to 5 were continued until the pH at the cathode decreased to the point where lead was solubilized. Tests 1 and 2 were interrupted earlier, in order to assess the conditions across the cell before the acid flushing. In Tests 2 to 5 the current was increased to 3 mA in order to flush acid through the speciment in a shorter time. Similarly, the length of the specimens was decreased in Tests 2, 4 and 5 to decrease the time for the acid front to reach the cathode.

Air-dry, air-floated Georgia Kaolinite (Thiele Kaolinite Co., Wrens, Georgia) was used. This mineral was selected due to its low activity and high electro-osmotic water transport efficiency. The characteristics of this soil are presented in Table 2.

TABLE 2

| | |
|---|---|
| Mineralogical Composition (% by weight) | |
| Kaolinite | 98 |
| Illite | 2 |
| Index Properties (ASTM D 4318)[a] | |
| Liquid Limit (%) | 64 |
| Plastic Limit (%) | 34 |
| Specific Gravity (ASTM D 854)[b] | 2.65 |
| % Finer than 2 micron, by weight | 90 |
| Activity | 0.32 |
| Cation Exchange Capacity (milliequivalents/100 gm of dry clay) | 1.06 |
| Proctor Compaction Parameters | |
| Maximum Dry Density,[c] Tons/$m^3$ | 1.37 |
| Optimum Water Content, % | 31.0 |
| Initial pH of Soil[c] | 4.7–5.0 |
| Compression Index ($C_c$) | 0.25 |
| Recompression Index ($C_r$) | 0.035 |
| Permeability of Specimens Compacted at the Wet of Standard Proctor Optimum ($\times 10^{-7}$ cm/sec)[d] | 6–8 |

[a]ASTM Method for Liquid Limit, Plastic Limit, and Plasticity Index of Soils (D 4318–83)
[b]ASTM Method for Specific Gravity of Soils [D854–58 (1979)]
[c]pH Measured at 50% Water Content
[d]Flexible wall permeability at full saturation The influent was obtained by washing the air-dry samples of kaolinite with distilled water at a 1:20 mass ratio, and collecting the supernatant after settling of the solids. This supernatant from the clay washing had the same mineral salts, other soluble material, and colloids as in the clay mineral. The clay washing reduced excess ions on the clay surfaces. Excess ions were removed in this experiment because they increase the pore fluid electrolyte concentration, and may have the effect of reducing the efficiency of electro-osmotic flow. The pH of the supernatant ranged between 6.5 to 8.5, and the predominant ions found were $Na^+$ and $SO_4^{2-}$. The normality of the supernatant was on the order of $10^{-4}$ equivalents per liter.

The exchange capacity of the kaolinite was found to be 1.06 milliequivalents per 100 gm of dry clay. Pb(II) concentrations of about 0.118 to 0.145 mg/g of dry clay were used, corresponding to 0.11 to 0.14 milliequivalents per 100 gm of dry clay, substantially below the cation exchange capacity of the mineral. The majority of Pb(II) at those concentrations was readily adsorbed onto the clay.

Lead solutions were obtained by quantitative dilution of a 5.04 g/l Pb(II) stock solution prepared with ACS reagent grade $Pb(NO_3)_2$ and distilled water. One kg samples of air-dry kaolinite were mixed with 1.5 liter portions of 100 mg/l of $Pb(NO_3)_2$ solution. The resulting slurry was stirred for 30 minutes to allow the lead distribution to equilibrate between the solid and liquid phases. The supernatant was sampled for lead determinations, used in calculating the amount of Pb(II) loaded onto the soil. The concentration in the supernatant generally varied between 3 ppm to 5 ppm, verifying that most of the lead was adsorbed onto the clay. The Pb(II)-loaded kaolinite slurry was then consolidated to a void ratio of about 2.10 to 2.60 in polyacrylite cylinders. (The void ratio is the ratio of void space volume to solid space volume.) The cylinders were cut to serve as the electro-osmosis cells. The distributions of initial water content, lead content, conductivity and pH across the specimens were determined by blank tests.

Figure 3:
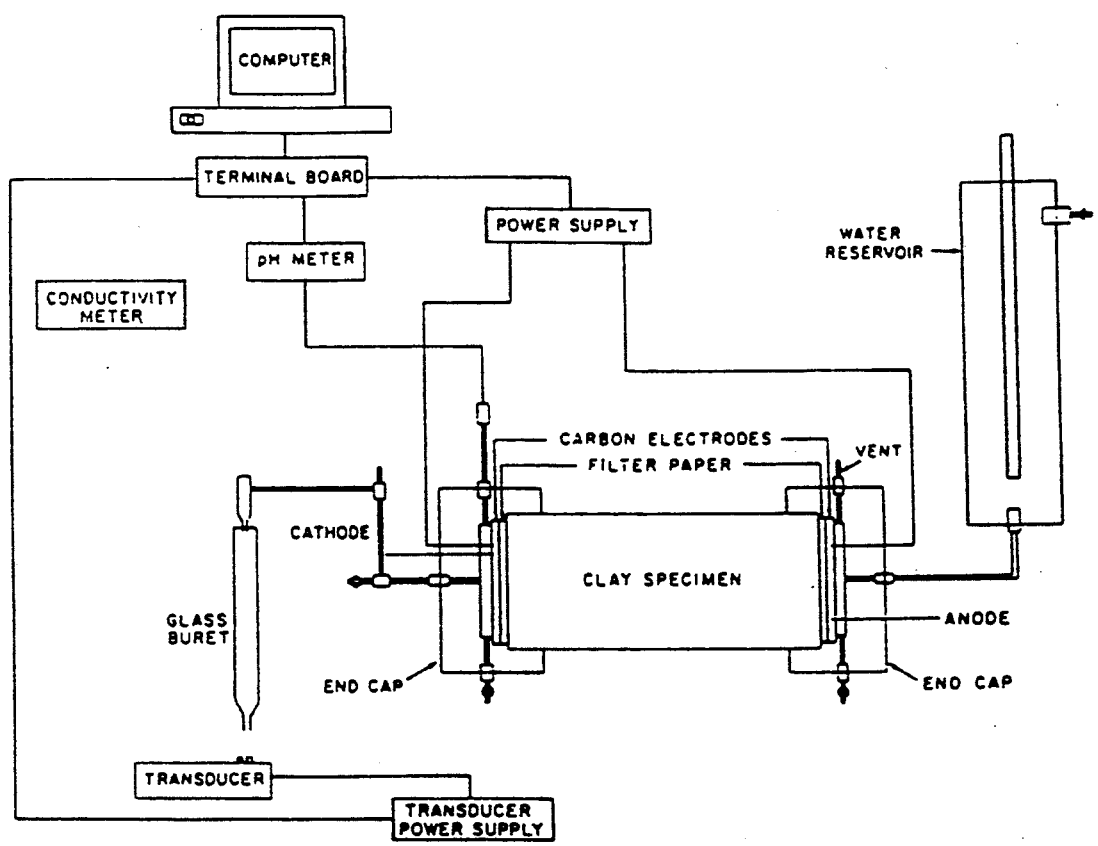
FIG. 3 illustrates an embodiment of the present invention in a laboratory setting.

Electro-osmosis test specimens were assembled as illustrated in FIG. 3. Inert graphite electrodes were used to prevent the introduction of electrode corrosion or dissolution products into the clay. A sheet of 8 micron filter paper was placed at each end of the specimen. Uniform flow across the electrodes was ensured by drilling fifty 0.3 cm holes into the electrodes. The electrodes were held in place with polyacrylate end caps, bolted together with threaded rods to avoid leakage. A liquid reservoir of 110 ml capacity was placed at each end. Holes were drilled into the top of each end cap above these reservoirs to allow venting of gaseous electrolysis products.

Specimens were placed in a horizontal configuration and tested. The electric current was applied to the cell by a coulostat having a maximum voltage output of 150 volts. The applied currents were maintained in an open flow arrangement in which a mariotte bottle was used at the anode side to maintain the external hydraulic gradient small and constant. Influent and effluent pH, conductivity of effluent, outflow, and current were continuously monitored.

After a selected period of current application, the specimen was promptly removed from the cell and sliced into 10 sections. Each segment was analyzed for water content, pH, conductivity, and lead content. Further, the pore fluid in each section was separately extracted under pressure applied by a jack to a 5 cm stainless steel die containing 5-10 gm of the specimen, or by centrifuging the specimen and decanting the pore fluid. This pore fluid was analyzed for lead content, conductivity, and pH. Both a pH meter and universal indicator paper were used to determine the pH values of the pore fluid and sliced segments of the specimen. Conductivity measurements were made in the pore fluid and in each individual slice with a conductivity meter.

All lead analyses were by flame atomic absorption at 217 nm. Lead was extracted from clay specimens by adding 20 ml of 1.6M $HNO_3$ to 5 gm soil taken from each slice, and leaving the slurry in a shaker for 48 hours at room temperature.

Figure 4:
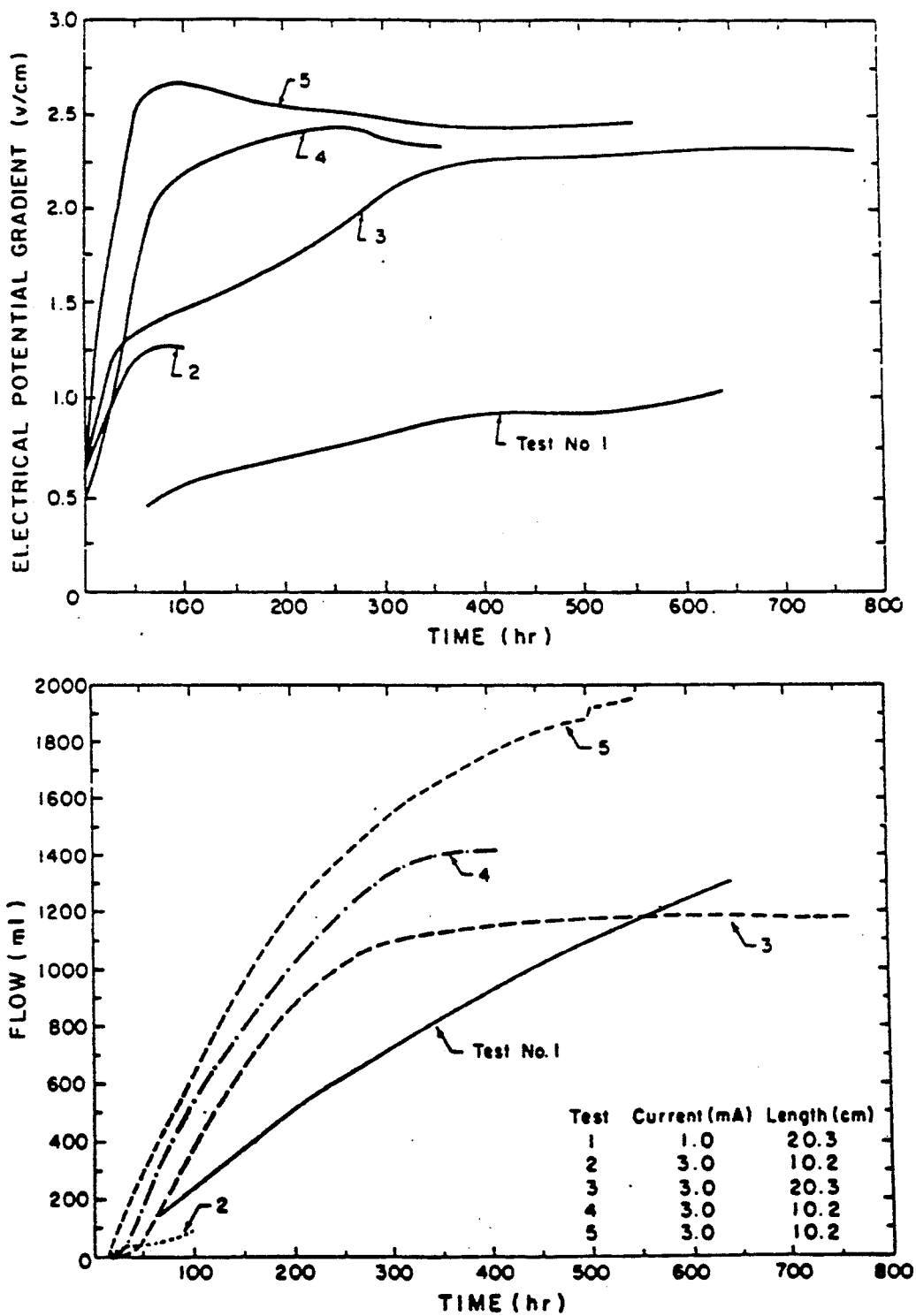
FIG. 4 illustrates net cell electrical potential gradient, and total flow versus time.

FIG. 4 presents the development of the net cell electrical potential gradient, and total flow versus time. The following observations were made:

(1) Under the constant current conditions employed in these tests, the cell electrical potential gradients increase from an initial average value of about 0.3 V/cm to a relatively constant value of 0.8 V/cm. The final values attained were approximately proportional to the applied current; e.g., in Test 1, the current was 1 mA, and the final electrical potential gradient was 0.8 to 1.0 V/cm; in the other tests, the current was 3 mA, and the mean gradient was 2.3 to 2.5 V/cm;

(2) There was no measurable water flow during the first 10 to 20 hours of current application. Subsequently, the flow rate increased rapidly, and then decreased nonlinearly in time; and (3) The total flow varied considerably in different tests at 3 mA, possibly due to variations in the initial water content of the specimens or other unknown factors.

These results show that the water flow rate in electro-osmosis is time-dependent.

Figure 5:
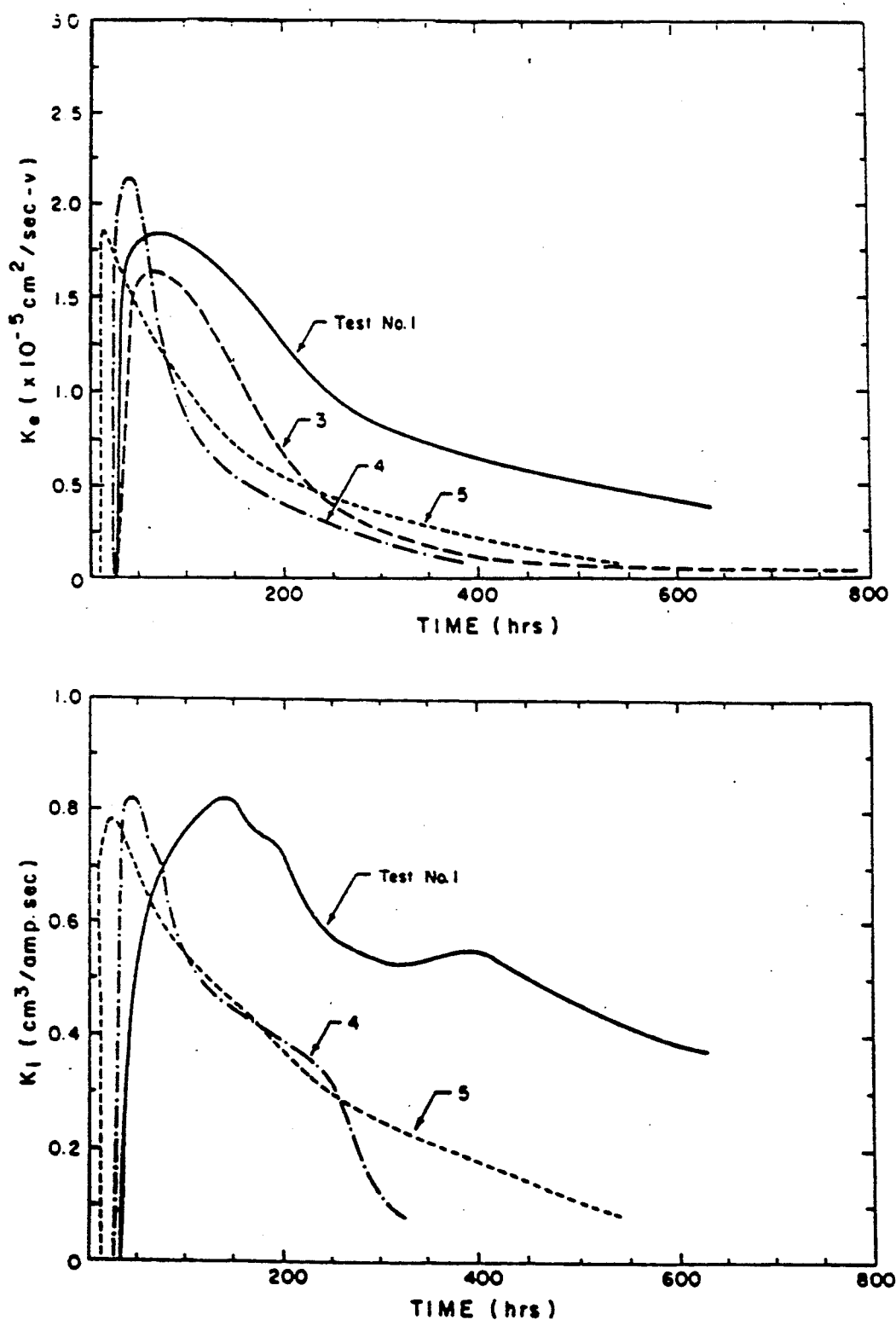
FIG. 5 illustrates changes in the electro-osmotic coefficient of permeability, and in the electro-osmotic water transport efficiency as a function of time.

FIG. 5 presents the changes in the empirical electro-osmotic coefficient of permeability, $k_e$, and the electro-osmotic water transport efficiency, $k_i$, in the tests. The tests indicate that (1) $k_e$ increases to 1.8 to $2.2 \times 10^{-5}$ cm$^2$/V-sec at the start of each test, and decreases by an order of magnitude in time (note the flow data in FIG. 4).

(2) Similarly, $k_i$ increases to 0.8 cm$^3$/amp-sec at the start of the tests, and decreases to less than 0.1 cm$^3$/amp-sec, in conformity with the flow data.

Time-dependent changes in $k_e$ and $k_i$ demonstrate that significant changes occur in the overall cell resistance, and hence the material's chemistry across the cell during the process. Therefore, contrary to the conventional belief, these coefficients are not constants for a specific soil, but instead are time-dependent variables controlled by the chemistry generated.

Figure 6:
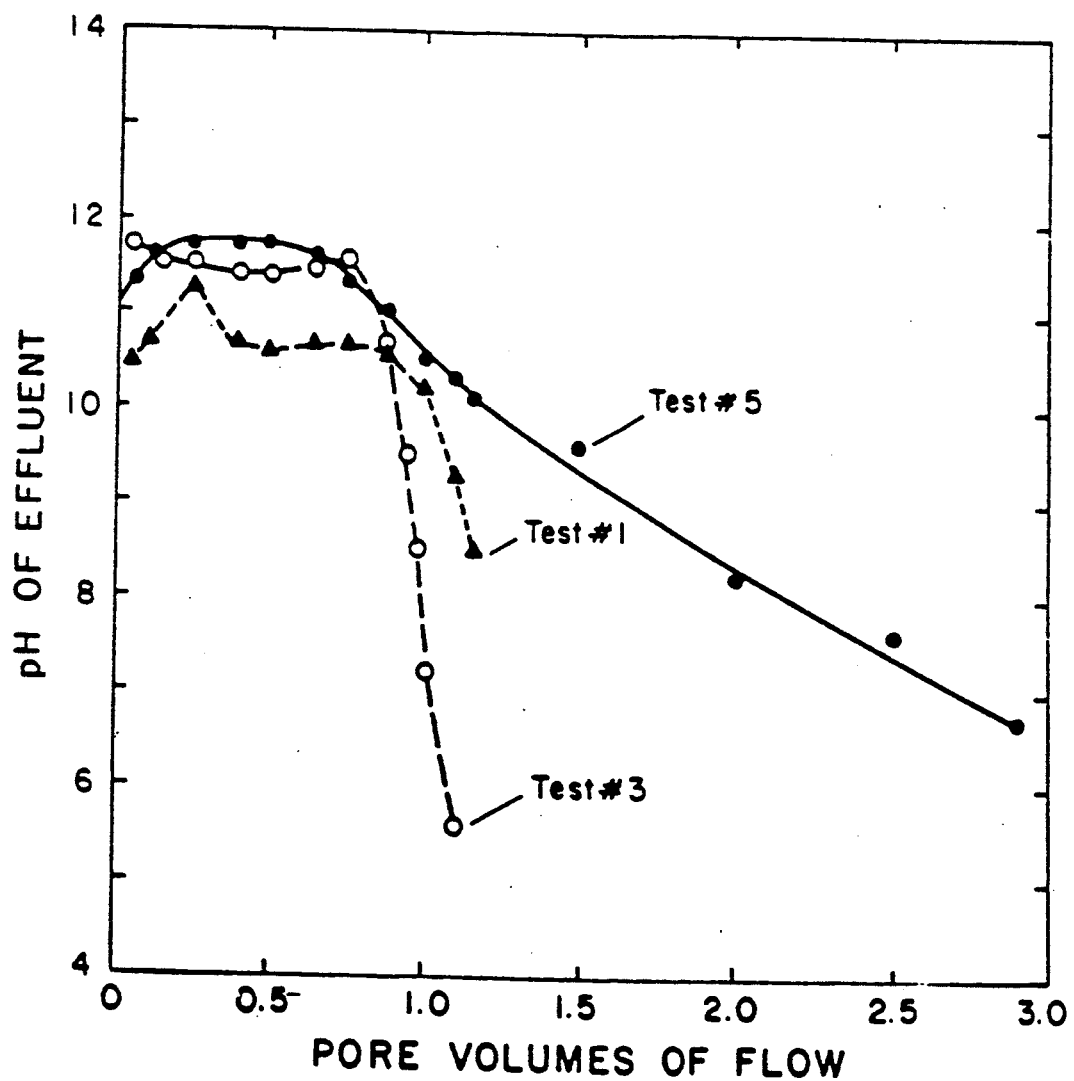
FIG. 6 illustrates effluent pH at the cathode versus the equivalent number of pore volumes of total flow.

FIG. 6 presents a plot of effluent pH at the cathode versus the equivalent number of pore volumes of total flow. Shortly after the start of the experiment, the pH at the cathode compartment rises to values of 11 to 12. Subsequently the pH remains relatively constant until 0.8 to 0.9 pore volumes of flow, after which it decreases with further processing. The decrease in pH accompanies the arrival of the acid front (see FIG. 4).

The drop in effluent pH confirms that the acid front generated at the anode flushes across the cell, neutralizing the base formed at the cathode, thereby decreasing the effluent pH. In the tests conducted, this decrease commences at about 0.8 to 0.9 pore volumes of flow.

Figure 7:
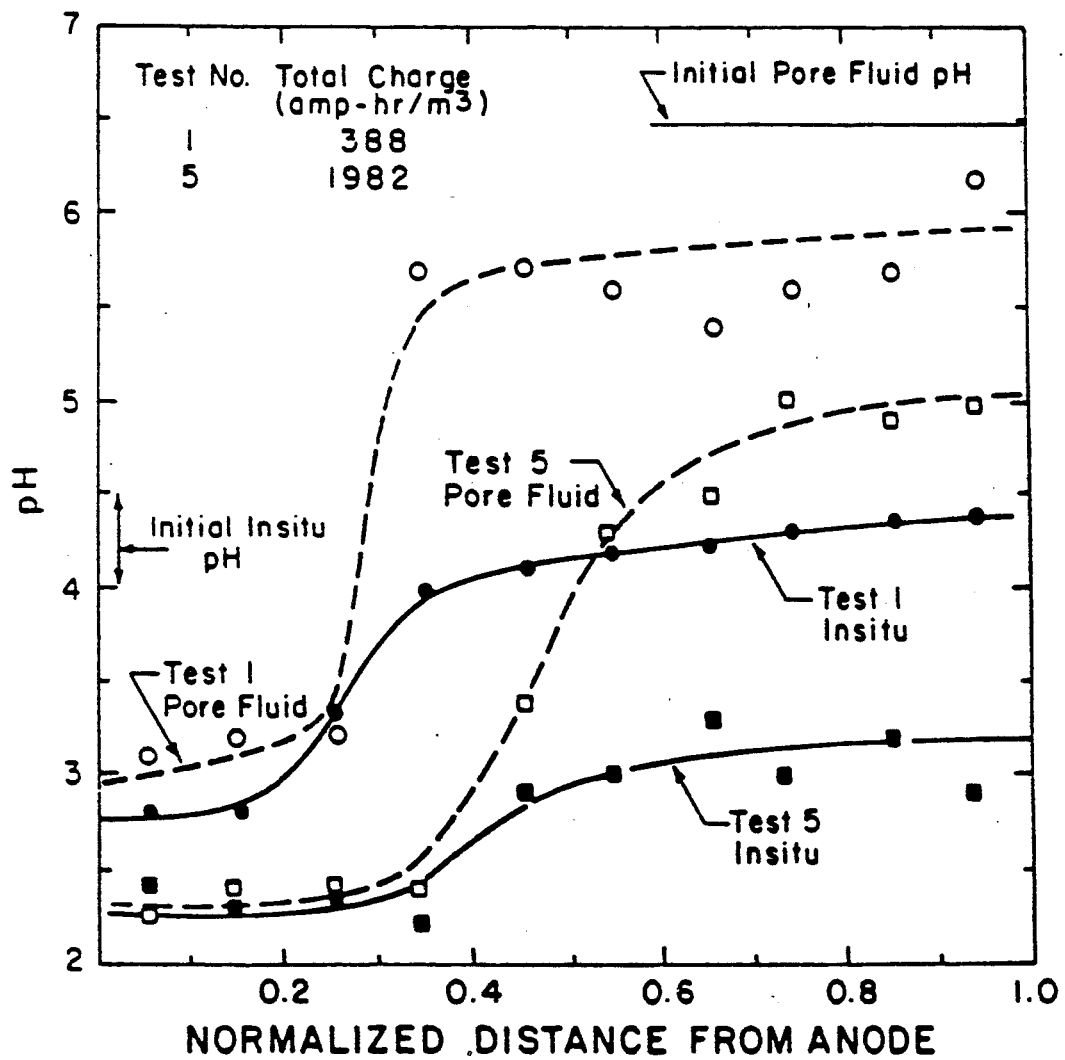
FIG. 7 illustrates in situ and pore fluid pH values across two test specimens.

Table 3 compares the pH distributions across the specimens upon completion of the tests. The pH values obtained with the pH probe inserted directly into the soil mass compare favorably with those obtained using indicator paper. Tests 1 and 5 were the tests with the least and greatest total charge passed per unit volume of specimen. FIG. 7 compares the in situ and pore fluid pH values across the specimen in these tests. The pH across the specimen decreased with an increase in the processing time, or with the total charge passed per unit volume of specimen. The increase in the pH from the anode to the cathode is a direct consequence of the advance of the acid front by diffusion, migration, and convection.

TABLE 3

| Normalized Distance from Anode | Blank Test | | Test 1 | | | Test 3 | | | Test 4 | | Test 5 | | |
|---|---|---|---|---|---|---|---|---|---|---|---|---|---|
| | I | II | I | II | III | I | II | III | I | II | I | II | III |
| 0.0–0.1 | 3.6 | 4.5 | 2.8 | 2.0 | 3.1 | 2.7 | 3.5 | 2.8 | 2.7 | 2.6 | 2.4 | 1.5 | 2.3 |
| 0.1–0.2 | 3.7 | 4.5 | 2.8 | 2.0 | 3.2 | 3.2 | 3.0 | 3.1 | 2.7 | 2.6 | 2.3 | 1.5 | 2.4 |
| 0.2–0.3 | 3.7 | 4.5 | 3.3 | 2.0 | 3.2 | 3.6 | 3.5 | 3.5 | 2.7 | 2.7 | 2.3 | 1.8 | 2.4 |
| 0.3–0.4 | 3.9 | 4.5 | 4.0 | 3.5 | 5.7 | 3.9 | 3.8 | 3.9 | 2.8 | 2.6 | 2.2 | 2.3 | 2.4 |
| 0.4–0.5 | 3.9 | 4.5 | 4.1 | 3.5 | 5.7 | 4.0 | 3.8 | 4.1 | 2.8 | 2.7 | 2.9 | 2.5 | 3.4 |
| 0.5–0.6 | 3.9 | 4.5 | 4.2 | 3.8 | 5.6 | 4.0 | 3.5 | 4.1 | 3.0 | 2.9 | 3.0 | 2.5 | 4.3 |
| 0.6–0.7 | 3.9 | 4.8 | 4.2 | 4.0 | 5.4 | 4.0 | 3.8 | 4.1 | 3.0 | 3.4 | 3.3 | 2.8 | 4.5 |
| 0.7–0.8 | 4.0 | 4.5 | 4.3 | 4.0 | 5.6 | 4.1 | 3.0 | 4.8 | 3.4 | 3.9 | 3.0 | 2.7 | 5.0 |

TABLE 3-continued

| Normalized Distance from Anode | Blank Test | | Test 1 | | | Test 3 | | | Test 4 | | Test 5 | | |
|---|---|---|---|---|---|---|---|---|---|---|---|---|---|
| | I | II | I | II | III | I | II | III | I | II | I | II | III |
| 0.8–0.9 | 4.0 | 4.5 | 4.4 | 4.0 | 5.7 | 4.0 | 3.0 | 4.6 | 3.8 | 4.3 | 3.3 | 2.5 | 4.9 |
| 0.9–1.0 | 4.0 | 5.0 | 4.4 | — | 6.2 | 4.1 | 3.0 | 4.9 | 4.2 | 5.9 | 2.8 | 2.5 | 5.0 |

I) In situ with pH meter
II) Litmus paper (Accuracy 0.5 pH units)
III) Pore fluid with pH meter It is interesting to note that as the cathode compartment is approached, the pore fluid pH was considerably larger than the in situ pH value. The pH is usually taken as quantitative indication of the activity of hydrogen ions in aqueous homogeneous solutions. Although the in situ pH values at the anode in Test 1 and at the cathode in Test 5 are comparable (pH=2.7–3.0), the pore fluid pH measurements show a substantial difference. This observation was repeated in all tests conducted. This observation implies that in situ pH measurements also depend on the degree of saturation of the clay surface by $H^+$ ions.

A possible explanation of these observations is suggested by considering the production of acid and base at the boundaries of the cell. As the process continues, the pore fluid pH close to the anode decreases more rapidly with the decrease in $k_i$. In other words, the dispersion of acid at the anode decreases. Some of the $H^+$ ions are readily adsorbed by the negatively charged clay surfaces because of the cation exchange capacity of the mineral. The adsorption mechanism increases the concentration of $H^+$ ions in the double layer, decreasing the pore fluid $H^+$ ion concentration. When the adsorption process reaches equilibrium, any excess ions are free to flow through the cell; however, the initial dispersion appears to be a non-equilibrium phenomenon. As the acid front moves through the specimen, it is dispersed by both advection and migration. The pore fluid with $H^+$ ion concentration lower than that at the anode finally meets and neutralizes the $OH^-$ ions generated at the cathode, which have back-diffused upstream. Thus the $H^+$ concentration in the vicinity of the cathode is eventually lowered. Consequently, the pH boundary conditions and flow rates eventually dominate the pH of the pore fluid at the cathode, while the in situ pH is controlled largely by the rates of migration, advection, and the rate at which the $H^+$ ions adsorb on the soil.

Conductivity is inversely related to the resistance offered to current flow. This resistance changes due to variations in pore sizes (porosity), tortuosity in the porous medium, and variations in pore fluid electrolyte concentration. Conductivity is measured in siemens (mhos) per unit distance between the measurement points in a medium. Conductivity rises from a very low value (about 1 microsiemen/cm) for deionized, distilled water, by orders of magnitude for a fluid containing electrolytes, depending on the concentration.

In electrokinetic soil processing, conductivity can either be calculated from the electrical potential drop across the electrodes and the current through the electrodes (apparent conductivity), or it can be directly measured by probes in the soil or the pore fluid with a conductivity meter. (Overvoltages associated with the electrode reactions should be made small in comparison to the cell's IR voltage drop.) In the electrolyte system present in the specimens of this study (0.118 to 0.145 mg/g of $Pb^{2+}$ in the soil and $10^{-4}$ equivalents of $Na^+$ and $SO_4^{2-}$ per liter in the pore fluid), conductivity values are sensitive indicators of $H^+$ and $OH^-$ concentrations if the $H^+$ and $OH^-$ concentrations exceed the initial pore fluid ionic concentrations.

The apparent conductivity, $K_a$, is calculated from the electrical potential drop across the electrodes, and is defined as $$K_a (\text{siemens/cm}) = I_t (\text{amp}) \, L \, (\text{cm}) / V_t (\text{volt}) \, A \, (\text{cm}^2),$$

where $I_t$ is the current, $V_t$ is the voltage difference between the current generating electrodes, L is the specimen length and A is the cross-sectional area of the specimen. This equation normalizes the conductivity across the cell, and allows comparison of conductivity in specimens having different lengths, different areas, different currents, or different voltage conditions.

Figure 8:
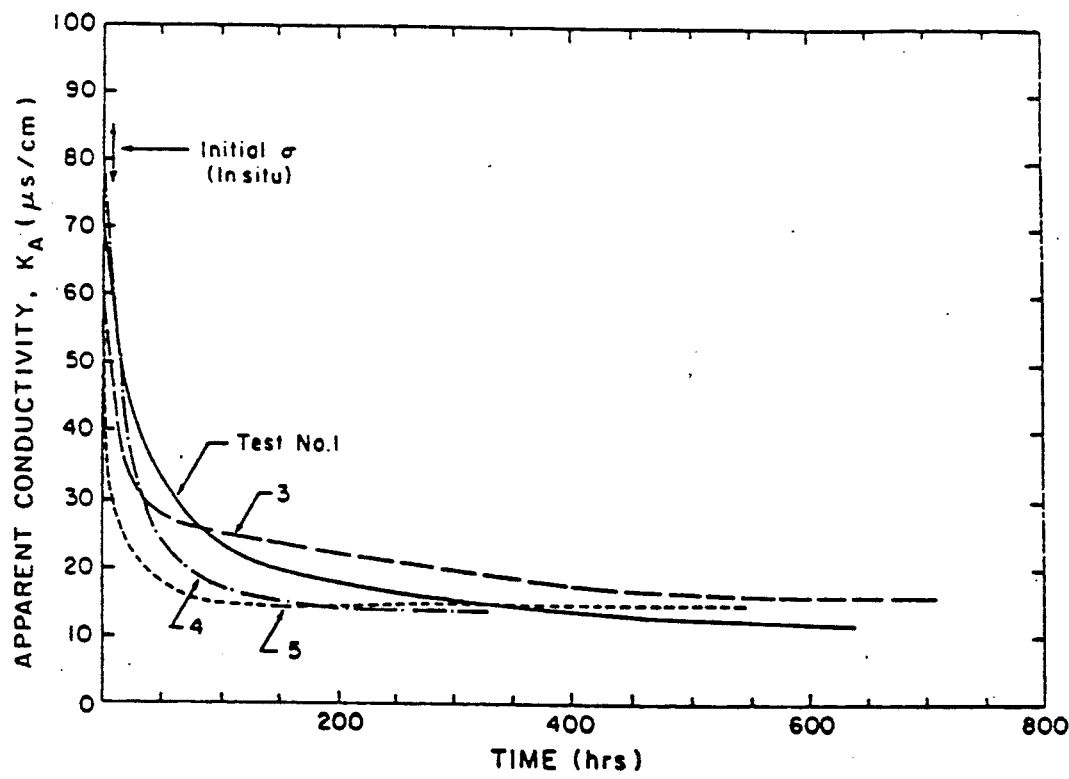
FIG. 8 illustrates changes in apparent conductivity of test specimens as a function of time.

FIG. 8 presents the change in apparent conductivity across the electrodes in the experiments conducted. Because the tests were conducted under constant current conditions, the decrease in $K_a$ over time reflects an increase in the resistance, and an increase in the voltage required to maintain the desired constant current. In all tests, the apparent conductivity steadily decreased from 60 to 80 micro-siemens/cm to 15 to 20 micro-siemens/cm. The initial in situ and pore fluid conductivities in sections of the specimen were measured to be 75 to 86 micro-siemens/cm and 186 to 202 micro-siemens/cm, respectively.

Apparent conductivity is a good approximation of actual soil conductivity only during the early phases of electro-osmosis, during the time when the electrolyte concentration is relatively constant across the cell. Therefore, the initial apparent conductivity value of 60 micro-siemens/cm to 80 micro-siemens/cm calculated across the electrodes compares favorably with the initial conductivity of 75 micro-siemens/cm to 85 micro-siemens/cm measured in segments across the cell. However, at longer times, the $K_a$ values calculated by the potential difference across the cell and the current supplied may underestimate the conductivity across the cell for the following reasons:

(1) the electrochemical overpotentials required to drive the electrode reactions will contribute to the measured voltage, increasing the resistance and hence causing the apparent conductivity to be lower than the actual specimen conductivity, (2) in the case of significant variations in electrolyte concentrations across the cell, $K_a$ would be more influenced by those locations offering the highest resistance to current flow. Therefore, when the conductivity in a limited section of the cell decreases significantly due to a decrease in available electrolyte ion concentrations, the voltage across the specimen would increase, and the calculated $K_a$ would decrease.

In order to develop a better understanding of the electrochemistry associated with electro-osmosis, it is necessary to evaluate the conductivity across the cell.

Figure 9:
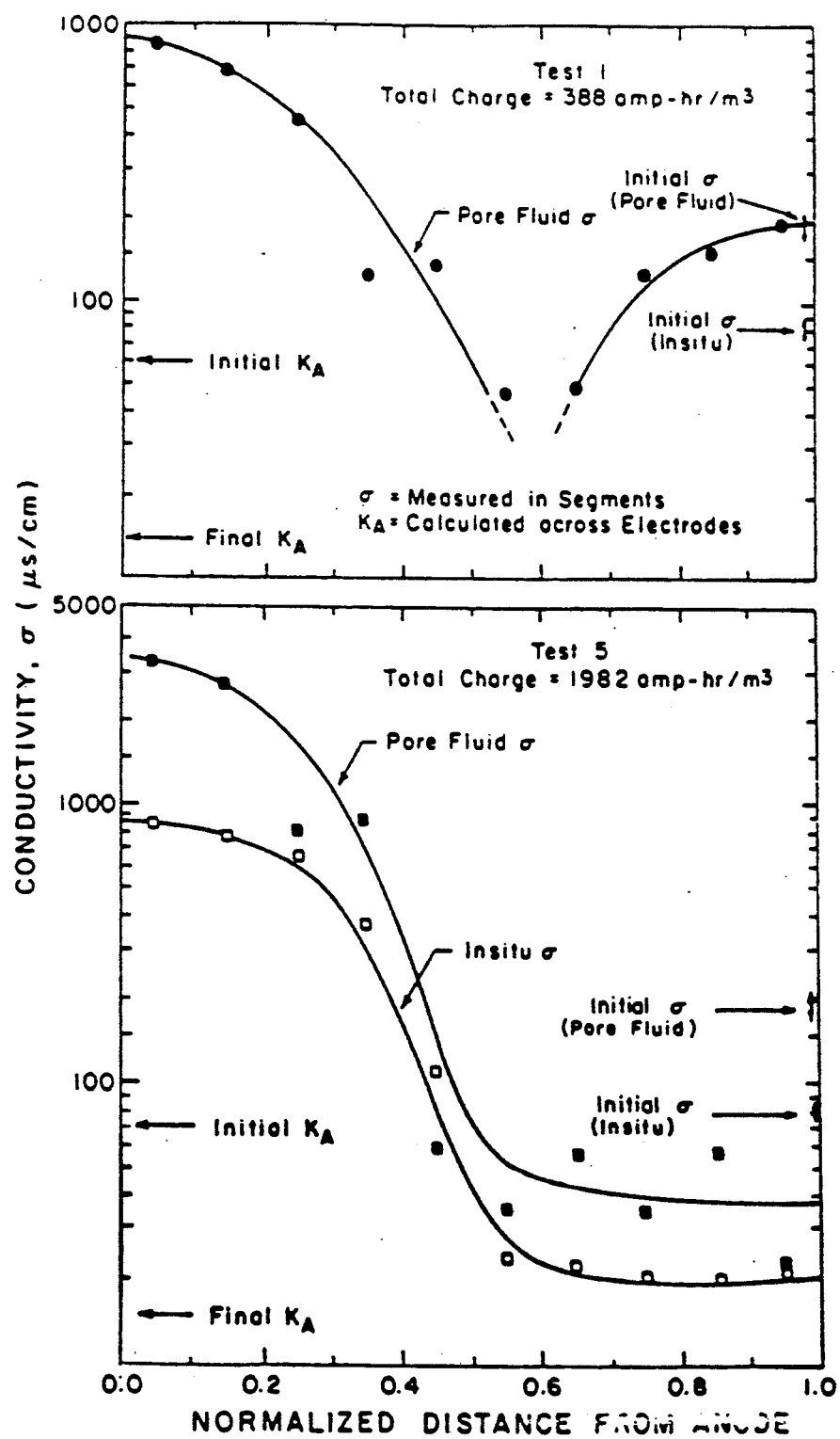
FIG. 9 illustrates conductivity profiles across two of the test specimens.

At the end of each test, conductivity measurements were taken both across each segment, and also in the pore fluid extracted from the segment. Table 4 presents the in situ and pore fluid conductivity profiles across the cell in the blank specimen and upon completion of each test. FIG. 9 compares the profiles in Tests 1 and 5.

TABLE 4

CONDUCTIVITY (microsiemens/cm)

| Normalized Distance from Anode | Blank Test In situ Pore Fluid | In situ Test No. | | |
|---|---|---|---|---|
| | | 3 | 4 | 5 |
| 0.0–0.1 | 74 | 202 | 500 | — | 956 |
| 0.1–0.2 | 77 | 202 | 255 | 638 | 770 |
| 0.2–0.3 | 77 | 202 | 117 | 600 | 653 |
| 0.3–0.4 | 81 | 187 | 50 | 465 | 362 |
| 0.4–0.5 | 82 | 187 | 17 | 347 | 111 |
| 0.5–0.6 | 82 | 186 | 14 | 283 | 24 |
| 0.6–0.7 | 86 | 186 | 14 | 158 | 23 |
| 0.7–0.8 | 86 | 202 | 12 | 128 | 20 |
| 0.8–0.9 | 84 | 202 | 14 | 157 | 20 |
| 0.9–1.0 | 84 | 202 | 104 | 27 | 22 |

| Normalized Distance from Anode | Pore Fluid Test No. | | | |
|---|---|---|---|---|
| | 1 | 3 | 4 | 5 |
| 0.0–0.1 | 994 | 1345 | 1420 | 3305 |
| 0.1–0.2 | 700 | 810 | 986 | 2800 |
| 0.2–0.3 | 486 | 272 | 900 | 800 |
| 0.3–0.4 | 123 | 107 | 875 | 880 |
| 0.4–0.5 | 139 | 46 | 655 | 59 |
| 0.5–0.6 | 46 | 34 | 448 | 36 |
| 0.6–0.7 | 49 | 71 | 240 | 49 |
| 0.7–0.8 | 124 | 66 | 148 | 35 |
| 0.8–0.9 | 146 | 26 | 59 | 57 |
| 0.9–1.0 | 194 | 33 | 50 | 23 |

Pore fluid conductivity is consistently higher than in situ conductivity, while the trend in both profiles across the cell is similar. Conductivity is directly related to the mobility and concentration of the ions carrying the charge. Therefore, ions which are immobile due to association with the double layers in the clay would not contribute significantly to the conductivity of a porous medium of this type. Consequently, a first order approximation is that the in situ conductivity is less than the pore fluid conductivity by a factor which depends upon the porosity and tortuosity of the medium.

Conductivity increases by at least an order of magnitude from the initial conductivity at the anode compartment of the cell, while it decreases by almost an order of magnitude in the cathode compartment. Electro-osmosis leads to significant variations in electrolyte concentrations across the cell. The $H^+$ ions in the pore fluid should significantly affect the conductivity of the system once their concentrations are at least on the order of the initial electrolyte concentrations. In fact, in the longer duration tests (Tests 3, 4, 5) the conductivity profiles follow the reverse of the trend observed in the pore fluid pH profiles, i.e., at the anode, low pore fluid pH gives high conductivity values; at the cathode, the neutralization reaction will make the pore fluid conductivity a more complex function of elapsed time.

Finally, in the shorter duration test (Test 1), pore fluid conductivity drops below the initial conductivity in the mid section of the cell, possibly indicating depletion due to migration of the initial electrolyte ions. Upon further processing, this decrease stretches across the cathode section (Test 5), suggesting that anion depletion or acid/base neutralization has depleted the available ion carriers.

These data suggest some reasons for the decrease in electro-osmotic flow rate, and the increase in the electrical potential gradient across the cell during the process:

(1) The significant increase in the electrolyte concentration due to the diffusion, migration, and advection of the $H^+$ ions into the specimen at the anode would be the fundamental reason for the decrease in flow rate in time. The resistance offered to current flow will be very low in this zone.

(2) The decrease in (the mobile) electrolyte concentration due to the increase in pH and due to the removal of cations by precipitation at the cathode section would increase the resistance to current flow. As a consequence, the electrical potential across the cell would increase.

The electrical potential gradients are nonlinear across the cell. Most of the electrical potential drop would be in the cathode section of the cell, where conductivity is low.

The efficiency of flow can depend on the pH at the anode. When low pH conditions are promoted at the anode, the electrolyte concentration rises rapidly at the anode section of the specimen, leading to a decrease in potential drop, decreasing flow from the anode to the specimen.

These results suggest that it is important to control the extent of electrode reactions and influent/effluent chemistry in order to improve the efficiency of electro-osmotic flow when the technique is used for remediation.

The following conclusions have been reached from these experiments:

(1) The acid front generated at the anode flushes across the specimen, ultimately decreasing the pH of the effluent;

(2) In response to the advance of the acid front across the cell, pore fluid and specimen conductivity increase in time at the anode section of the cell;

(3) The conductivity in the cathode section initially decreases in time in response to changing electrolyte concentrations. This decrease in conductivity is displayed externally by the increase in resistance and the voltage needed across the electrodes to maintain a constant current; and (4) The coefficients of electro-osmotic permeability and electro-osmotic water transport efficiency decrease in time in response to an increase in voltage across the cell, or a decrease in flow.

The chemistry and flow in electro-osmosis are dependent upon the electrolytes generated at the electrodes and the initial chemistry in the specimen. The physicochemical interactions, ion flow associated with the current, and the geotechnical properties of soils after electro-osmotic flow will be strongly influenced by the chemistry developed in the system. The process of the present invention can be used for flushing soils with acid or other electrolytes. Control of the chemistry at the electrodes is important for efficient use of this process. Previous work with electro-osmosis has not adequately accounted for the importance of this chemistry.

Figure 10:
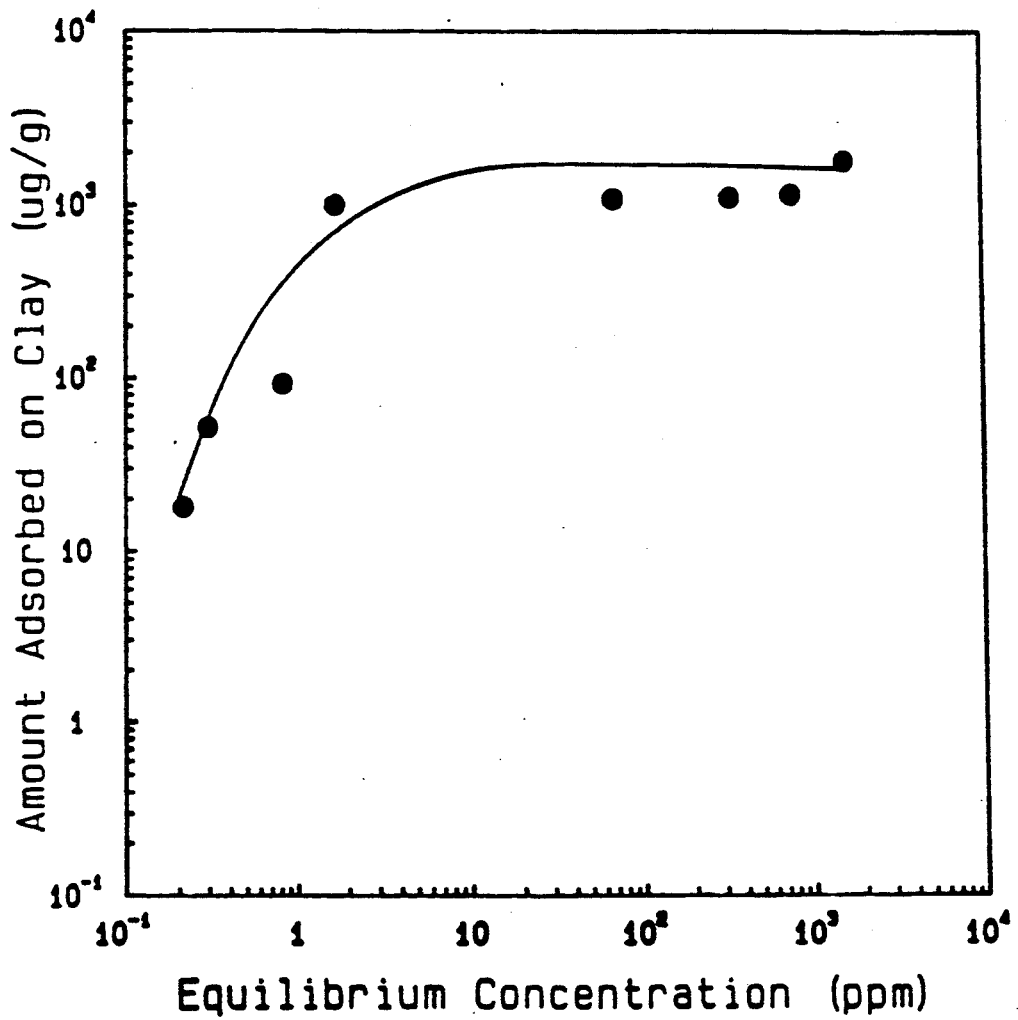
FIG. 10 illustrates the Pb(II) adsorption isotherm for Georgia Kaolinite.

Adsorption tests were conducted after thoroughly washing the kaolinite with distilled water and introducing a stock solution of $Pb(NO_3)_2$ at different concentrations. FIG. 10 shows the Pb(II) adsorption isotherm for Georgia kaolinite. This mineral can adsorb about 1.1 mg of Pb(II) per gm of dry clay. Any Pb(II) beyond this quantity would be found largely in the pore fluid. This limiting quantity is called the cation exchange capacity of the mineral, and is often expressed in milliequivalents per 100 gm of dry mineral. Thus the Pb(II) exchange capacity of Georgia kaolinite is 1.06 milliequivalents per 100 gm of this mineral.

The adsorption isotherm indicates that practically all Pb(II) at concentrations of 0.118 to 0.145 mg/g of dry clay should be readily adsorbed by the clay.

The removal of adsorbed Pb(II) by electrokinetic soil processing first involves its desorption into the pore fluid by the H+ ions advancing across the specimen, and its subsequent flushing to the cathode by migration and advection.

A 1:2 mixture (by weight) of dry clay and Pb(II) solution was prepared by thorough mixing to ensure homogeneity. The initial Pb(II) distribution throughout the clay was determined in the clay-Pb(II) solution mix before it was placed in the consolidation cell. After consolidation, the Pb(II) concentration was rechecked both from trimmings of the specimens, and from the concentration decrease in the pore fluid after equilibration with the clay. The concentrations in the liquid phase from the consolidated soil specimens varied between 3 ppm and 5 ppm, verifying that most of the Pb(II) was adsorbed on the kaolinite.

The water distribution throughout the cell was determined from control specimens consolidated to the same extent as the test specimens. The water content varied from 65 percent at the ends to a maximum of 92 percent in the middle of the specimen. This variation was due to incomplete consolidation of the specimen. Therefore Pb(II) concentrations varied slightly across the specimens. Table 5 presents a summary of the initial Pb(II) levels and other testing data for these specimens.

TABLE 5

| Parameter | Test No. | | | | |
|---|---|---|---|---|---|
| | 1 | 2 | 3 | 4 | 5 |
| Dimensions | | | | | |
| Length (cm) | 20.3 | 10.2 | 20.3 | 10.2 | 10.2 |
| Area (cm$^2$) | 81.1 | 81.1 | 81.1 | 81.1 | 81.1 |
| Current Density (mA/cm$^2$) | 0.012 | 0.037 | 0.037 | 0.037 | 0.307 |
| Initial Pb(II) Concentration (microgram/g of dry soil) | 144 ± 1.4 | 134 ± 1.5 | 145 ± 0.5 | 123 ± 0.2 | 117 ± 5.1 |
| Total Charge per Unit Volume of Soil (amp-hr/m$^3$) | 388 | 362 | 2345$^2$ (1390) | 1483 | 1982 |
| Pore Volumes of Flow | 1.16 | 0.17 | 1.06$^2$ | 2.38 | 3.33 |

[1]Mean and one standard deviation
[2]Test continued until a total charge of 2345 amp-hr/m$^3$, flow stopped at 1390 amp-hr/m$^3$ Table 6 provides profiles of final Pb(II) concentrations, $C_f$, in the specimens as a percentage of the initial concentrations, $C_i$, given in Table 5. Tests 1 and 2 correspond to the tests with the least amount of charge passed, while tests 3 to 5 were continued until the pH at the cathode decreased substantially below the initial values, indicating the flushing of the acid front across the specimens.

TABLE 6

| Normalized Distance from Anode | Concentration Ratio, $C_f/C_i$ Test No. | | | | |
|---|---|---|---|---|---|
| | 1 | 2 | 3 | 4 | 5 |
| 0.00–0.10 | 0.21 | 0.60 | 0.05 | 0.09 | 0.05 |
| 0.10–0.20 | 0.30 | 0.37 | 0.07 | 0.12 | 0.06 |
| 0.20–0.30 | 0.48 | 0.31 | 0.08 | 0.11 | 0.08 |
| 0.30–0.40 | 0.52 | 0.92 | 0.10 | 0.12 | 0.08 |
| 0.40–0.50 | 0.79 | 0.69 | 0.10 | 0.16 | 0.10 |
| 0.50–0.60 | 1.69 | 1.22 | 0.11 | 0.14 | 0.12 |

TABLE 6-continued

| Normalized Distance from Anode | Concentration Ratio, $C_f/C_i$ Test No. | | | | |
|---|---|---|---|---|---|
| | 1 | 2 | 3 | 4 | 5 |
| 0.60–0.70 | 1.35 | 0.76 | 0.10 | 0.17 | 0.11 |
| 0.70–0.80 | 1.11 | 1.10 | 0.12 | 0.29 | 0.13 |
| 0.80–0.90 | 1.14 | 2.09 | 0.18 | 0.20 | 0.14 |
| 0.90–1.00 | 0.89 | 2.02 | 0.15 | 0.28 | 0.21 |

Figure 11:
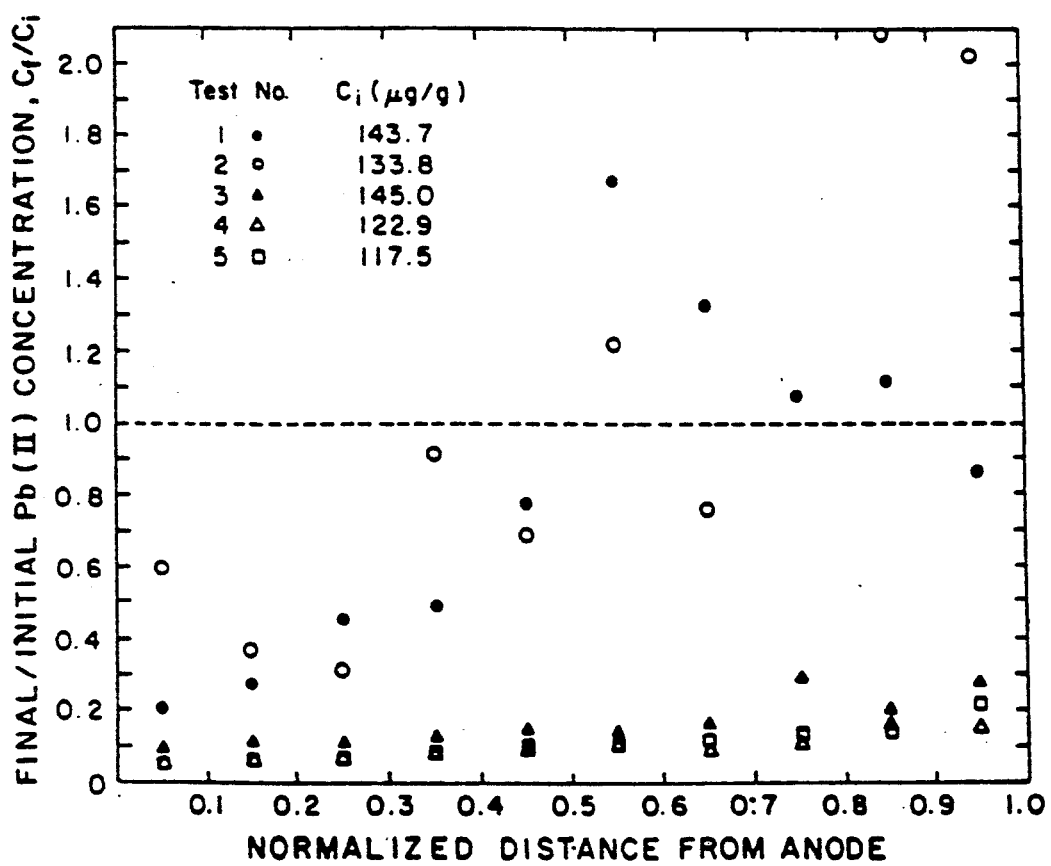
FIG. 11 illustrates Pb(II) concentration profiles across five test specimens following electro-osmosis.

FIG. 11 presents a comparison of these results. Pb(II) was only partially removed from the anode section in Tests 1 and 2 and accumulated at the cathode section, while 75 to 95 percent of Pb(II) was removed across the cell in the later tests (Test 3, 4 and 5).

The mass balance in each test is provided in Table 7. A significant amount of the removed Pb(II) was electrodeposited at the cathode in Tests 3, 4 and 5, with the longer processing times and the higher total charge input. These results indicate that the acidified pore fluid flushes the desorbed Pb(II) across the clay to the cathode, where it is electrodeposited. In the shorter duration tests (Tests 1 and 2), Pb(II) is redistributed across the specimens with the advancing acid front, and very little reaches the cathode because of the higher pH in this region. The higher pH can precipitate Pb(II). Note that in basic conditions Pb(II), or other metallic species, may effectively be anionic due to association of OH$^-$ ions.

The ability to flush the entire specimen with electrogenerated acid can ensure the desorption of contaminant species, and their electrodeposition or removal at the cathode.

At the end of the process, the basic effluent at the cathode may be pumped back into the anode section to de-acidify the soil acidified during the electrokinetic process.

TABLE 7

| Description | TOTAL AMOUNT OF Pb(II), mg Test No. | | | | |
|---|---|---|---|---|---|
| | 1 | 2 | 3 | 4 | 5 |
| Specimen: | | | | | |
| Initial | 186.3 | 56.8 | 184.0 | 65.9 | 82.0 |
| Final | 160.2 | 54.4 | 19.4 | 12.6 | 8.6 |
| Electrodes | | | | | |
| Cathode | 0.1 | 2.1 | 149.4 | 42.3 | 72.7 |
| Anode | <0.1 | <0.1 | <0.1 | <0.1 | <0.1 |
| Effluent | 0.1 | 0.1 | 0.1 | 0.6 | 0.5 |
| Influent | * | * | * | * | * |
| Error[1] | 26.1 | 0.2 | 14.2 | 10.4 | 0.3 |

TABLE 7-continued

| | TOTAL AMOUNT OF Pb(II), mg Test No. | | | | |
|---|---|---|---|---|---|
| Description | 1 | 2 | 3 | 4 | 5 |
| (Initial-Final) | | | | | |

*Influent reservoir was not sampled for Pb(II) concentration.
[1] Most of the error is possibly due to the variations in water contents of blank and test specimens, resulting in differences in the total lead amount calculated in each slice. Some Pb(II) may have diffused into the influent reservoir. It is also possible that the Pb(II) was not fully desorbed by $HNO_3$.

Figure 12:
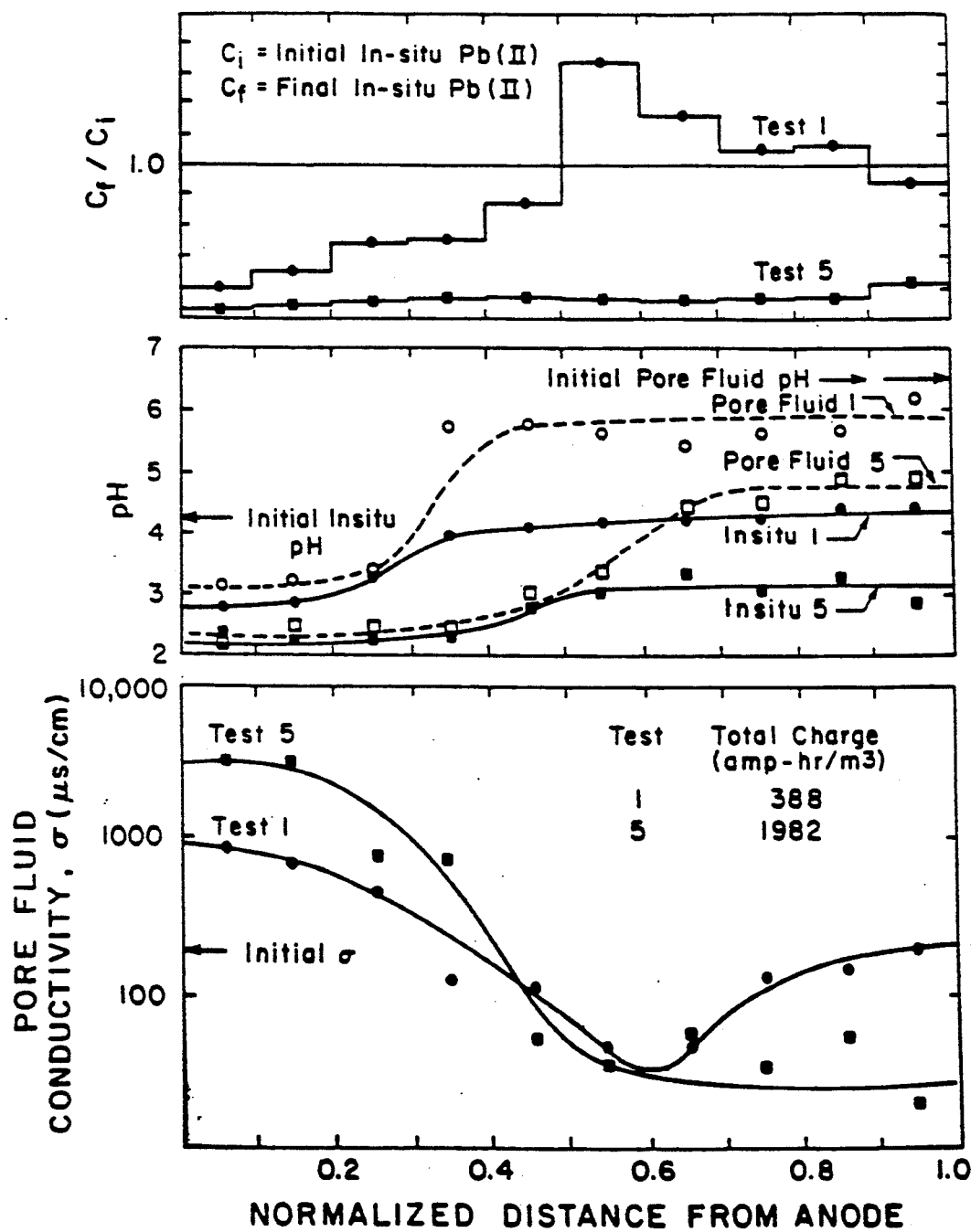
FIG. 12 illustrates Pb(II) concentration ratios, pH, and conductivity across two of the test specimens.

FIG. 12 compares the concentration ratio, $C_f/C_i$, the pH, and the conductivity data across the cell for Tests 1 and 5. This figure clearly shows that during the early stages of the process (Test 1), as the acid front generated at the anode advanced into the cell, Pb(II) was removed from the low pH environment in the first half of the cell (anode section), while it accumulated in the higher pH environment in the second half of the cell (cathode section). Conductivity increased at the anode by the advancing $H^+$ ions, sharply decreased to values below the initial conductivity in the mid-section, and rose again at the cathode. With further processing (Test 5), pH values were consistently lowered, and Pb(II) was removed across the whole cell. In this test, the conductivity at the anode section rose to higher values than in Test 1, and lowered substantially below the initial values across the cathode section. This lowering of the conductivity in the cathode section was consistently observed in all longer duration tests (Tests 3 to 5). This phenomenon was displayed externally by the decrease in the apparent conductivity calculated across the electrodes.

Figure 13:
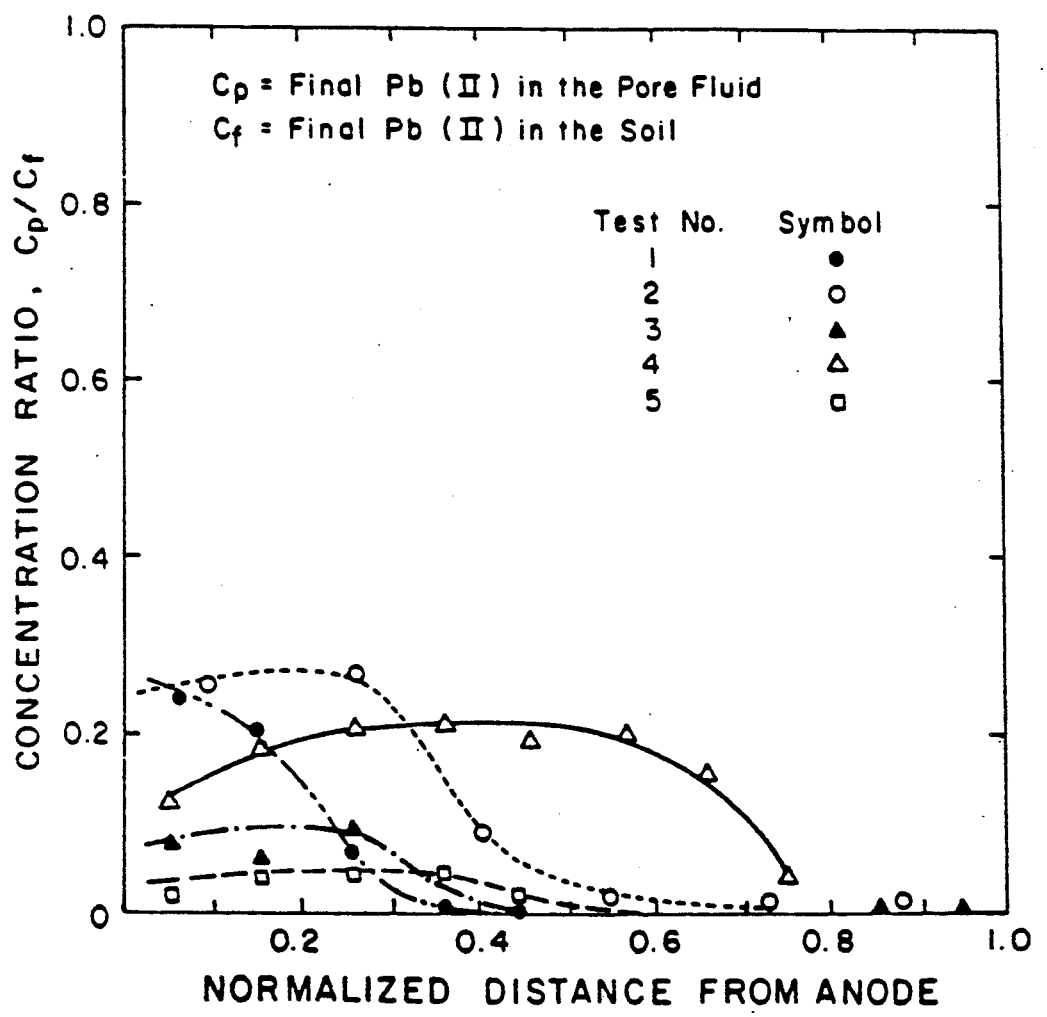
FIG. 13 illustrates the final Pb(II) concentrations in the pore fluid as a ratio of the concentration in the soil for five tests.

In order to better understand the chemistry associated with the process, Pb(II) concentrations in the pore fluid were also measured in each section. FIG. 13 presents the ratios of the Pb(II) concentration in the pore fluid, $C_p$, to the final Pb(II) concentration in the soil, $C_f$. A portion of the Pb(II) was in the pore fluid in the anode section. In the cathode section, pore fluid did not contain any Pb(II); Pb(II) was either precipitated in the higher pH environment as $Pb(OH)_2$, or was absorbed on the clay surfaces. These results were in conformity with the conductivity and pH data, which showed an increase in the pore fluid pH and a decrease in conductivity in the cathode section. In light of these findings, it is hypothesized that the decrease in conductivity in the cathode section was both due to an ion depletion by precipitation of Pb(II) and migration of other ions, as well as to the formation of water by reaction of the $H^+$ and $OH^-$ ions.

In tests with constant current conditions, the energy expended was directly related to the time integral of the resistance across the cell, or was inversely related to the time integral of the apparent conductivity. This relationship implies that energy expenditure is substantially increased due to the evolution of the high resistance zone near the cathode.

Figure 14:
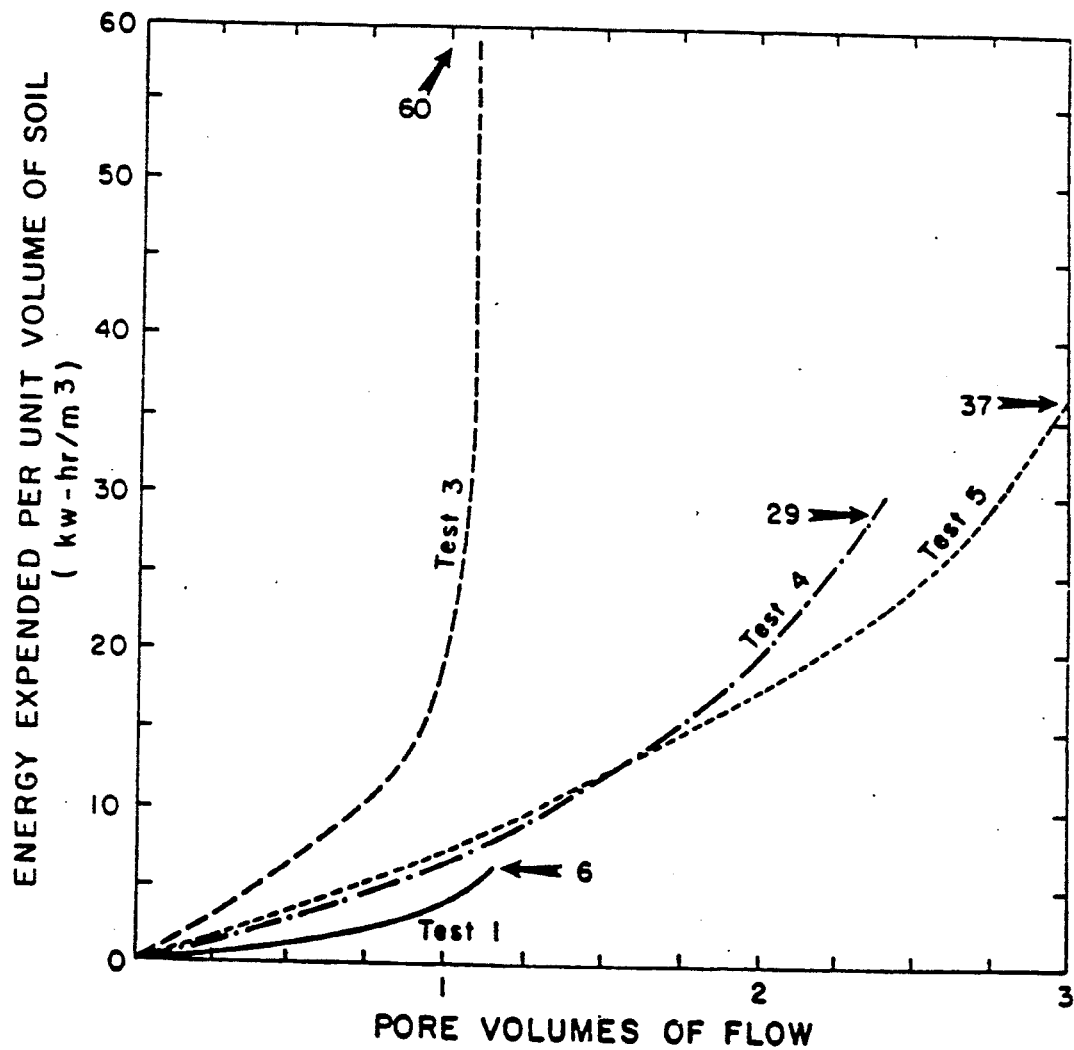
FIG. 14 illustrates the energy used versus volume of flow for five tests.

FIG. 14 presents a plot of the energy expended per unit volume of soil versus the volume of flow recorded, in units of total pore volume. The total flow was only 1.06 pore volumes in Test 3; the reason for this difference is not well understood. The energy expenditure in this test was clearly different from those in the other three tests. Although the energy expenditure trend in Test 3 was different, Pb(II) was efficiently removed in all three of the longer duration Tests, Numbers 3, 4, and 5. The energy expenditures at the times these tests were terminated were 60, 29, and 37 kW-hr/m³, respectively.

From the test data presented, it is not possible to discern the necessary minimum energy needed to flush Pb(II); however, the energy expenditure in these tests demonstrate that it should be below the range of 29 to 60 kW-hr/m³.

Several variables affect the efficiency of the process:

(1) Chemistry Generated at the Electrodes: low pH conditions generated at the anode cause desorption from the soil and ionization of heavy metals and organic compounds. However, a flux of high $H^+$ ion concentration also results in an increase in conductivity, and a decrease in electro-osmotic flow. The pH conditions at the anode and the cathode should be controlled and adjusted, depending on the cation exchange capacity of the soil, the type and concentration of the chemicals in the soil, and the initial pH of the medium;

(2) Water Content of the Soil: electro-osmotic flow is promoted at higher water content, and at full saturation conditions. Therefore, deposits highly saturated with water should be favored;

(3) Type and Concentration of Chemicals in the Soil: an increase in the conductivity of the specimen results in a decrease in the resistance offered to current flow, and hence ion flow will be governed more by diffusion. Soils with low initial ionic strengths of mobile species favor high electro-osmotic efficiencies; and (4) Current Density: at an inert anode, and for 100 percent faradaic efficiency of water electrolysis, the current density controls the flux of $H^+$ ions. As shown by the results above, control of current density is critical to ensure optimal electro-osmotic efficiency and contaminant removal. The cathodic current density and species available in the vicinity of the cathode will establish the efficiency of the reduction processes. These values will vary to a greater extent than those for the anode process, because the pH at the cathode and the species reaching the cathode vary considerably more with processing time.

The removal process would not necessarily be made more efficient by merely increasing the current densities. In soils with high levels of conductivity, it may be important to lower the current density, and possibly decrease the ionic strength as well, until a substantial increase in electro-osmotic flow efficiency is achieved.

The following conclusions were reached:

(1) Pb(II) in a range including levels of 0.118 to 0.145 mg/g of dry kaolinite can be efficiently removed by electrokinetic soil processing. The removed Pb(II) was mostly electrodeposited at the cathode;

(2) The removal is due to the flushing of acid generated at the anode across the specimen by diffusion, migration, and advection;

(3) As a result of the movement of $H^+$ ions, significant variations occur in chemistry and conductivity across the cell;

(4) In short duration tests, where the acid front does not completely flush across the specimen, Pb(II) is removed from the acidified anode section while it precipitates in the cathode section; and (5) The energy expended in the tests where Pb(II) was effectively removed varied between 29 kWh/m³ and 60 kWh/m³.

It is desirable to use an inert anode in this process, in other words, one which will not substantially react or dissolve electrochemically. Examples of materials from which such inert anodes may be made include carbon (such as graphite), noble metals, platinum group metals, coated variations of such electrodes (for example, platinized titanium), doped (conductive) oxide electrodes, oxide coated conductors, epoxy, paints, or other films containing any of the above conductors (for example, a graphite-containing epoxy), or any combination which will render the anode electrochemically inert under the conditions used.

It is also desirable to use a non-reactive cathode, in other words, one made of a conductive material that will not react or dissolve substantially under the pH and other conditions used, for example, stainless steel, graphite, or materials similar to those listed above for anodes. The cathode may be a site where metallic contaminants are electrodeposited, or where organic contaminants are reduced.

The term "soil" encompasses any solid or semi-solid substance (such as a slurry) which contains a contaminant whose removal or other remediation is desired.

An open electrode is one which permits the flow of a liquid, such as water. An open electrode may be one which itself is perforated or porous, such as rods, pipes, or conductive granular media (e.g., granular carbon backfill in a hole in the soil) to permit the ingress or egress of a liquid; an open electrode may also be one which is not itself perforated, but which is located within a perforated container.

A supply of water or an aqueous solution is desirable at the anode to permit sufficient electro-osmotic flow. Water or an aqueous solution may be introduced at the cathode also. The water supplied to the soil may be derived from an artificial source, or may be supplied from a naturally occurring source, such as groundwater or rainwater.

Electro-osmotic flow is enhanced if the ionic strength is low. For soil containing a high concentration of soluble electrolytes, it may be desirable first to flush the system with water containing a low ionic concentration, e.g., distilled water, deionized water, or rainwater. The flow of pore fluid through the soil can also be enhanced if external hydraulic pressure is applied.

Acid solutions may be introduced at either electrode to facilitate desorption or solubility of metal ions. In addition, the soil near either electrode may be buffered.

Additives such as negatively charged colloids may be introduced near the cathode to improve electro-osmotic flow. Such additives will act as anion carriers to help sustain the flow.

A "front of low pH" means an area in the soil whose pH is sufficiently low to remove a contaminant.

Differing pH fronts may be used to enhance decontamination under different processing conditions.

Pre-electrolysis with alternating current may in some cases be useful to demobilize or remove certain materials by irreversible reactions.

A direct electrode/soil contact is not essential for the process. For example, a trench of solution or ground water may be used to provide electric contact between the electrode and the soil.

Introducing oxygen at the cathode, and electrically promoting its reaction with water, can generate hydrogen peroxide in situ, which may enhance the clean-up process.

Introducing nutrients, bacteria, or both into the soil through electro-osmosis may enhance biodegradation of contaminants.

The process of this invention may also be used to remove radioactive contaminants from soil.

What we claim is:

1. An electroosmotic process in soil comprising the steps of:
    (a) transmitting direct electric current through the soil between an inert anode and a non-reactive cathode;
    (b) supplying a first liquid which comprises water to the soil near said anode; and
    (c) driving a front of low pH through the soil electroosmotically from the vicinity of said anode in the direction towards said cathode, until said front reaches soil in the vicinity of said cathode.

2. A process as recited in claim 1, wherein said anode comprises a graphite-containing film.

3. A process as recited in claim 1, wherein said cathode comprises a graphite-containing film.

4. A process as recited in claim 1, additionally comprising the step of introducing a second liquid which comprises water and which has a pH greater than 7.0 to the soil near said anode.

5. A process as recited in claim 1, wherein said anode is an open electrode.

6. A process as recited in claim 5, additionally comprising the steps of:
    (a) introducing a second liquid having a low ionic concentration and comprising water into the soil; and
    (b) reducing the ionic concentration in the soil.

7. A process as recited in claim 6, wherein said second liquid has a pH which will remove a contaminant from the soil.

8. A process as recited in claim 5, additionally comprising the step of buffering the soil near said anode.

9. A process as recited in claim 5, additionally comprising the step of buffering the soil near said cathode.

10. A process as recited in claim 5, additionally comprising the step of removing a contaminant from the soil.

11. A process as recited in claim 10, wherein said contaminant comprises a metallic ion.

12. A process as recited in claim 11, wherein said metallic ion comprises plumbous lead.

13. A process as recited in claim 11, additionally comprising the step of reducing said metallic ion near said cathode.

14. A process as recited in claim 10, wherein said contaminant comprises an organic compound.

15. A process as recited in claim 14, additionally comprising the step of reducing said organic compound near said cathode.

16. A process as recited in claim 10, wherein said contaminant is radioactive.

17. A process as recited in claim 16, additionally comprising the step of reducing said radioactive contaminant.

18. A process as recited in claim 10, wherein the timing of said driving step, and the pH profile of said low pH front have been selected to enhance the removal of the contaminant from the soil.

19. A process as recited in claim 1, additionally comprising the step of introducing a second liquid which comprises water and which has a pH less than 7.0 to the soil near said cathode.

20. An electrochemical process in soil comprising the steps of:
    (a) transmitting direct electric current through the soil between an inert anode and a non-reactive cathode;

(b) supplying a first liquid which comprises water to the soil near said anode; and (c) introducing a nutrient into the soil through electroosmosis.

21. A process as recited in claim 20, additionally comprising the step of driving a front of low pH through the soil from the vicinity of said anode in the direction towards said cathode, until said front reaches soil in the vicinity of said cathode.

22. An electrochemical process in soil comprising the steps of:

(a) transmitting direct electric current through the soil between an inert anode and a non-reactive cathode;

(b) supplying a first liquid which comprises water to the soil near said anode; and (c) introducing bacteria into the soil through electroosmosis.

23. A process as recited in claim 22, additionally comprising the step of driving a front of low pH through the soil from the vicinity of said anode in the direction towards said cathode, until said front reaches soil in the vicinity of said cathode.

24. An electrochemical process in soil comprising the steps of:

(a) transmitting direct electric current through the soil between an inert anode and a non-reactive cathode;

(b) supplying a first liquid which comprises water to the soil near said anode; and (c) introducing a second liquid, taken from the soil near said cathode, to the soil near said anode.

25. A process as recited in claim 24, additionally comprising the step of driving a front of low pH through the soil from the vicinity of said anode in the direction towards said cathode, until said front reaches soil in the vicinity of said cathode.

26. An electrochemical process in soil comprising the steps of:

(a) transmitting direct electric current through the soil between an inert anode and a non-reactive cathode;

(b) supplying a first liquid which comprises water to the soil near said anode;

(c) introducing oxygen to the soil near said cathode; and (d) generating hydrogen peroxide in the soil through the electrically promoted reaction of the oxygen with water.

27. A process as recited in claim 26, additionally comprising the step of driving a front of low pH through the soil from the vicinity of said anode in the direction towards said cathode, until said front reaches soil in the vicinity of said cathode.

28. An electrochemical process in soil comprising the steps of:

(a) transmitting direct electric current through the soil between an inert anode and a non-reactive cathode;

(b) supplying a first liquid which comprises water to the soil near said anode; and (c) applying external hydraulic pressure to at least a portion of the liquid.

29. A process as recited in claim 28, additionally comprising the step of driving a front of low pH through the soil from the vicinity of said anode in the direction towards said cathode, until said front reaches soil in the vicinity of said cathode.

30. An electrochemical process in soil comprising the steps of:

(a) transmitting direct electric current through the soil between an inert anode and a non-reactive cathode;

(b) supplying a first liquid which comprises water to the soil near said anode; and (c) introducing a negatively-charged colloid into the soil near said cathode through electroosmosis.

31. A process as recited in claim 30, additionally comprising the step of driving a front of low pH through the soil from the vicinity of said anode in the direction towards said cathode, until said front reaches soil in the vicinity of said cathode.

32. An electrochemical process in soil comprising the steps of:

(a) transmitting direct electric current through the soil between an inert anode and a non-reactive cathode;

(b) supplying a first liquid which comprises water to the soil near said anode; and (c) transmitting alternating electric current through the soil.

33. A process as recited in claim 38, additionally comprising the step of driving a front of low pH through the soil from the vicinity of said anode in the direction towards said cathode, until said front reaches soil in the vicinity of said cathode.

* * * * *